US012679768B2

(12) United States Patent (10) Patent No.: US 12,679,768 B2
Piercy et al. (45) Date of Patent: Jul. 14, 2026

(54) GYPSUM PANEL CONTAINING A POLYOL COMPOUND AND/OR AN ALKOXYLATED COMPOUND

(71) Applicant: Gold Bond Building Products, LLC, Charlotte, NC (US)

(72) Inventors: Robert Piercy, Mesa, AZ (US); Gene Whittington, Fort Mill, SC (US); R. G. Iyer, Fort Mill, SC (US); Eli Stav, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 831 days.

(21) Appl. No.: 17/992,366

(22) Filed: Nov. 22, 2022

(65) Prior Publication Data

US 2023/0159393 A1     May 25, 2023

Related U.S. Application Data

(60) Provisional application No. 63/283,000, filed on Nov. 24, 2021.

(51) Int. Cl.

| | |
|---|---|
| B32B 13/04 | (2006.01) |
| B32B 5/18 | (2006.01) |
| B32B 5/20 | (2006.01) |
| B32B 13/08 | (2006.01) |
| B32B 13/14 | (2006.01) |
| B32B 29/00 | (2006.01) |
| C04B 24/10 | (2006.01) |
| C04B 28/14 | (2006.01) |
| C04B 38/00 | (2006.01) |
| E04B 2/72 | (2006.01) |
| B32B 5/24 | (2006.01) |
| B32B 15/04 | (2006.01) |
| B32B 15/20 | (2006.01) |
| B32B 27/06 | (2006.01) |
| C04B 111/00 | (2006.01) |

(52) U.S. Cl.
CPC ............... C04B 24/10 (2013.01); B32B 5/18 (2013.01); B32B 13/04 (2013.01); B32B 29/007 (2013.01); C04B 28/14 (2013.01); C04B 38/0054 (2013.01); E04B 2/723 (2013.01); B32B 5/245 (2013.01); B32B 15/046 (2013.01); B32B 15/20 (2013.01); B32B 27/065 (2013.01); B32B 2250/40 (2013.01); B32B 2262/101 (2013.01); B32B 2607/00 (2013.01); C04B 2111/0062 (2013.01); C04B 2201/50 (2013.01)

(58) Field of Classification Search
None
See application file for complete search history.

(56) References Cited

U.S. PATENT DOCUMENTS

| | | | |
|---|---|---|---|
| 2,078,199 A | 4/1937 | King | |
| 2,571,343 A | 10/1951 | Dailey et al. | |
| 3,393,116 A | 7/1968 | Larson | |
| 4,278,468 A | 7/1981 | Selbe et al. | |
| 4,655,950 A | 4/1987 | Michalek | |
| 4,681,644 A | 7/1987 | Dozsa | |
| 5,534,059 A | 7/1996 | Immordino | |
| 8,088,218 B2 | 1/2012 | Blackburn et al. | |
| 8,597,426 B2 | 12/2013 | Lee et al. | |
| 8,617,718 B2 | 12/2013 | Rohlf et al. | |
| 8,801,852 B2 | 8/2014 | Lee et al. | |
| 9,487,654 B2 | 11/2016 | Petrovic et al. | |
| 9,617,412 B2 | 4/2017 | Petrovic et al. | |
| 10,119,004 B2 | 11/2018 | Petrovic et al. | |
| 10,125,049 B2 * | 11/2018 | Lee ................. | C04B 38/0061 |
| 11,697,618 B2 * | 7/2023 | Stav .................. | C04B 28/145 |
| | | | 106/779 |
| 12,071,376 B2 * | 8/2024 | Stav .................. | C04B 28/145 |
| 2002/0017222 A1 * | 2/2002 | Luongo ............. | B28B 19/0092 |
| | | | 106/631 |
| 2011/0054081 A1 | 3/2011 | Dierschke et al. | |
| 2012/0167805 A1 | 7/2012 | Wittbold et al. | |
| 2013/0005861 A1 | 1/2013 | Dierschke et al. | |
| 2015/0175482 A1 * | 6/2015 | Stav .................. | C04B 28/145 |
| | | | 106/779 |
| 2020/0180271 A1 * | 6/2020 | Bailey ................ | B32B 29/005 |
| 2022/0098108 A1 * | 3/2022 | Young ............... | C04B 28/145 |
| 2025/0011238 A1 * | 1/2025 | Stav .................. | C04B 24/38 |

* cited by examiner

*Primary Examiner* — Michael J Feely
(74) *Attorney, Agent, or Firm* — Dority & Manning, P.A.

(57) ABSTRACT

The present invention is directed to a gypsum panel and a method of making such gypsum panel. For instance, in one embodiment, the gypsum panel comprises a gypsum core and a first facing material and a second facing material sandwiching the gypsum core, wherein the gypsum core includes gypsum and an alkoxylated compound. In another embodiment, the gypsum panel comprises a gypsum core and a first facing material and a second facing material sandwiching the gypsum core, wherein the gypsum core includes gypsum and a polyol compound and wherein the gypsum panel exhibits a humidified deflection of greater than 0 inches to 0.05 inches. The methods of the present invention are directed to making the aforementioned gypsum panels by providing the first facing material, providing a gypsum slurry comprising gypsum, water, and the respective compound onto the first facing material, and providing the second facing material on the gypsum slurry.

21 Claims, No Drawings

GYPSUM PANEL CONTAINING A POLYOL COMPOUND AND/OR AN ALKOXYLATED COMPOUND

CROSS-REFERENCE TO RELATED APPLICATION

The present application claims filing benefit of U.S. Provisional Patent Application Ser. No. 63/283,000 having a filing date of Nov. 24, 2021, which is incorporated herein by reference in its entirety.

BACKGROUND OF THE INVENTION

Gypsum panels are commonly employed in drywall construction of interior walls and ceilings and also have other applications. Generally, these gypsum panels are formed from a gypsum slurry including a mixture of calcined gypsum, water, and other conventional additives. The mixture is cast and allowed to set by reaction of the calcined gypsum with the water. During the production process, free or unreacted water is removed during a drying or heating process in order to provide a relatively dry product. Upon drying, the gypsum core of the panel includes a void structure that can affect the properties of the panel, such as strength. However, with a desire to improve the properties of the panel generally as well as minimizing the weight of the panel, the void structure as well as the panel strength can be detrimentally affected.

As a result, there is a need to provide an improved gypsum panel that provides an improvement in the panel strength.

SUMMARY OF THE INVENTION

In accordance with one embodiment of the present invention, a gypsum panel is disclosed. The gypsum panel comprises a gypsum core and a first facing material and a second facing material sandwiching the gypsum core, wherein the gypsum core includes gypsum and an alkoxylated compound.

In accordance with another embodiment of the present invention, a method of making a gypsum panel is disclosed. The method comprises: providing a first facing material, providing a gypsum slurry comprising gypsum, water, and an alkoxylated compound onto the first facing material, and providing a second facing material on the gypsum slurry.

In accordance with another embodiment of the present invention, a gypsum panel is disclosed. The gypsum panel comprises a gypsum core and a first facing material and a second facing material sandwiching the gypsum core, wherein the gypsum core includes gypsum and a polyol compound and wherein the gypsum panel exhibits a humidified deflection of greater than 0 inches to 0.05 inches.

In accordance with another embodiment of the present invention, a method of making a gypsum panel is disclosed. The method comprises: providing a first facing material, providing a gypsum slurry comprising gypsum, water, and a polyol compound onto the first facing material, and providing a second facing material on the gypsum slurry wherein the gypsum panel exhibits a humidified deflection of greater than 0 inches to 0.05 inches.

DETAILED DESCRIPTION

Reference now will be made in detail to various embodiments. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a gypsum panel and a method of making such gypsum panel. In particular, the gypsum panel includes a gypsum core including polyol compound, an alkoxylated compound (e.g., an alkoxylated compound of such polyol compound) as defined herein, or a mixture thereof. In this regard, the gypsum core includes gypsum (i.e., calcium sulfate dihydrate), the aforementioned compound, and may include other optional additives. The present inventors have discovered that the gypsum panel disclosed herein can have various benefits due to the use of the polyol compound and/or alkoxylated compound. For instance, the present inventors have discovered that the mechanical properties and characteristics of the panel may be improved along with improvement in the core void structure.

In this regard, the gypsum core of the gypsum panel may have a particular void structure. For instance, core voids having a diameter of less than 300 microns may be less than 80%, such as less than 60%, such as less than 50%, such as less than 40%, such as less than 30% or less, such as 25% or less, such as 20% or less, such as 15% or less, such as 10% or less of the total core voids. In this regard, core voids having a diameter of less than 300 microns may be 0.01% or more, such as 0.1% or more, such as 0.2% or more, such as 0.5% or more, such as 1% or more, such as 2% or more, such as 3% or more, such as 5% or more. In one embodiment, such core voids may reference any air voids due to voids generated from the use of a soap/foam.

Similarly, core voids having a diameter of less than 150 microns may be less than 50%, such as 40% or less, such as 30% or less, such as 25% or less, such as 20% or less, such as 18% or less, such as 15% or less, such as 10% or less, such as 9% or less, such as 8% or less, such as 7% or less, such as 5% or less of the total core voids. In this regard, core voids having a diameter of less than 150 microns may be 0.01% or more, such as 0.1% or more, such as 0.2% or more, such as 0.5% or more, such as 1% or more, such as 2% or more, such as 3% or more, such as 5% or more, such as 8% or more, such as 10% or more. In one embodiment, such core voids may reference any air voids due to voids generated from the use of a soap/foam.

Also, core voids having a diameter of less than 100 microns may be less than 50%, such as 40% or less, such as 30% or less, such as 25% or less, such as 20% or less, such as 18% or less, such as 15% or less, such as 10% or less, such as 9% or less, such as 8% or less, such as 7% or less, such as 5% or less of the total core voids. In this regard, core voids having a diameter of less than 100 microns may be 0.01% or more, such as 0.1% or more, such as 0.2% or more, such as 0.5% or more, such as 1% or more, such as 2% or more, such as 3% or more, such as 5% or more, such as 8% or more, such as 10% or more. In one embodiment, such core voids may reference any air voids due to voids generated from the use of a soap/foam.

In addition, core voids having a diameter of less than 50 microns may be 40% or less, such as 30% or less, such as 25% or less, such as 20% or less, such as 18% or less, such as 15% or less, such as 10% or less, such as 9% or less, such as 8% or less, such as 7% or less, such as 5% or less of the total core voids. In this regard, core voids having a diameter of less than 50 microns may be 0.01% or more, such as 0.1% or more, such as 0.2% or more, such as 0.5% or more, such as 1% or more, such as 2% or more, such as 3% or more, such as 5% or more, such as 8% or more, such as 10% or more. In one embodiment, such core voids may reference any air voids due to voids generated from the use of a soap/foam.

In this regard, the average core void size may be 150 microns or more, such as 200 microns or more, such as 250 microns or more, such as 300 microns or more, such as 350 microns or more, such as 400 microns or more, such as 500 microns or more. The average core void size may be 1,500 microns or less, such as 1,300 microns or less, such as 1,100 microns or less, such as 1,000 microns or less, such as 900 microns or less, such as 800 microns or less, such as 700 microns or less, such as 600 microns or less, such as 500 microns or less, such as 400 microns or less, such as 300 microns or less. In one embodiment, such core voids may reference any air voids due to voids generated from the use of a soap/foam. Furthermore, while the aforementioned references an average core void size, it should be understood that in another embodiment, such size may also refer to a median core void size.

The void sizes may be determined using means in the art. For instance, a scanning electron microscopy may be utilized wherein cross-sections are analyzed at a 50× magnification as indicated in the test method disclosed herein. During the review, edge circumferences are drawn on the voids and measured to calculate the void size and area.

Furthermore, by utilizing the polyol compound and/or alkoxylated compound, in particular the alkoxylated compound, as disclosed herein, the voids, such as the air voids, may have improved wall strength as indicated by the wall thickness. For instance, the average wall thickness may be 0.001 mm or more, such as 0.005 mm or more, such as 0.01 mm or more, such as 0.03 mm or more, such as 0.05 mm or more, such as 0.08 mm or more, such as 0.09 mm or more, such as 0.1 mm or more, such as 0.12 mm or more, such as 0.14 mm or more, such as 0.16 mm or more, such as 0.18 mm or more, such as 0.2 mm or more, such as 0.22 mm or more, such as 0.24 mm or more, such as 0.26 mm or more, such as 0.28 mm or more. The wall thickness may be 0.5 mm or less, such as 0.45 mm or less, such as 0.4 mm or less, such as 0.38 mm or less, such as 0.35 mm or less, such as 0.33 mm or less, such as 0.3 mm or less, such as 0.28 mm or less, such as 0.26 mm or less, such as 0.24 mm or less, such as 0.22 mm or less, such as 0.2 mm or less, such as 0.18 mm or less, such as 0.16 mm or less, such as 0.14 mm or less, such as 0.12 mm or less, such as 0.1 mm or less.

As indicated herein, the present invention discloses a gypsum panel. The gypsum panel includes a gypsum core having a gypsum layer surface. In particular, the gypsum layer surface includes a first gypsum layer surface and a second gypsum layer surface opposing the first gypsum layer surface. A facing material is provided on the gypsum layer surface. For instance, a first facing material is provided on the first gypsum layer surface and a second facing material is provided on the second gypsum layer surface. In this regard, the first facing material and the second facing material sandwich the gypsum core.

In general, the gypsum core, may comprise calcium sulfate dihydrate. In addition, the first gypsum core also comprises a polyol compound and/or an alkoxylated compound. In one embodiment, the gypsum core comprises the polyol compound. In another embodiment, the gypsum core comprises the alkoxylated compound. In a further embodiment, the gypsum core comprises both the polyol compound and the alkoxylated compound.

In general, the polyol compound may be any polyol compound. For instance, the polyol compound may be a sugar, a sugar alcohol, a polyether, a polysaccharide, or a mixture thereof. In one embodiment, the polyol compound may include glycerol. In another embodiment, the polyol compound may include a sugar. In a further embodiment, the polyol compound may include a sugar alcohol. In an even further embodiment, the polyol compound may include a polyether. In another further embodiment, the polyol compound may include a polysaccharide.

As indicated above, the polyol compound may include a sugar. The sugar may be glucose, sucrose, fructose, lactose, dextrose, or a mixture thereof. In one embodiment, the sugar may be glucose. In another embodiment, the sugar may be sucrose. In a further embodiment, the sugar may be fructose. In an even further embodiment, the sugar may be lactose. In a further embodiment, the sugar may be dextrose.

As indicated above, the polyol compound may include a sugar alcohol. The sugar alcohol may be glycerol, maltitol, sorbitol, mannitol, xylitol, erythritol, isomalt, threitol, arabitol, galactitol, fucitol, iditol, inositol, volemitol, lactitol, or a mixture thereof. In one embodiment, the sugar alcohol may be glycerol. In another embodiment, the sugar alcohol may be sorbitol. In a further embodiment, the sugar alcohol may be mannitol. In an even further embodiment, the sugar alcohol may be erythritol. In another embodiment, the sugar alcohol may be xylitol.

The sugar alcohol may have from 3 carbon atoms to 24 carbon atoms. For instance, the sugar alcohol may have 3 or more carbon atoms, such as 4 or more carbon atoms, such as 5 or more carbon atoms, such as 6 or more carbon atoms, such as 7 or more carbon atoms, such as 8 or more carbon atoms, such as 10 or more carbon atoms, such as 12 or more carbon atoms, such as 16 or more carbon atoms, such as 20 or more carbon atoms. The sugar alcohol may have 24 or less carbon atoms, such as 20 or less carbon atoms, such as 18 or less carbon atoms, such as 14 or less carbon atoms, such as 10 or less carbon atoms, such as 8 or less carbon atoms, such as 6 or less carbon atoms, such as 5 or less carbon atoms, such as 4 or less carbon atoms. For instance, the sugar alcohol may have 3 carbon atoms. In another embodiment, the sugar alcohol may have 4 carbon atoms. In a further embodiment, the sugar alcohol may have 5 carbon atoms. In an even further embodiment, the sugar alcohol may have 6 carbon atoms.

As indicated above, the polyol compound may include a polyether. The polyether may include polyethylene glycol, polypropylene glycol, polyglycerol, a polyglycerol ester, or a mixture thereof. In one embodiment, the polyether may include polyethylene glycol. In another embodiment, the polyether may include polypropylene glycol. In a further embodiment, the polyether may be a polyglycerol. In another embodiment, the polyether may be a polyglycerol ester. For example, the polyglycerol ester may be a fatty acid ester.

As indicated above, the polyol compound may include a polysaccharide. In general, a polysaccharide includes a large number of glucose monosaccharide units joined together by glycosidic bonds. Generally, polysaccharides can be found in plants and seeds. The polysaccharide may be chitin, chitosan, alginate, polydextrose, cyclodextrin, or a mixture thereof. In this regard, in one embodiment, the polysaccharide may be a dextrin. For instance, the dextrin may be a maltodextrin. The polysaccharide may be a starch. For instance, the starch may be a corn starch, a wheat starch, a milo starch, a potato starch, a rice starch, an oat starch, a barley starch, a cassava starch, a tapioca starch, a pea starch, a rye starch, an amaranth starch, or other commercially available starch.

The alkoxylated compound may be a compound have an $—(O—R_1)_n—$ functionality wherein $R_1$ is an alkyl and n is an integer of 1 or more. For instance, $R_1$ may be an alkyl having from 1 to 5 carbon atoms, such as from 1 to 4 carbon atoms, such as from 1 to 3 carbon atoms, such as from 2 to 3 carbon atoms. In this regard, $R_1$ may be a methylene. In another embodiment, $R_1$ may be an ethylene. In a further embodiment, $R_1$ may be a propylene. In an even further embodiment, $R_1$ may be a butylene.

In addition, n is an integer of 1 or more. For instance, n may be 1 or more, such as 2 or more, such as 3 or more, such as 5 or more, such as 10 or more, such as 15 or more, such as 20 or more, such as 25 or more, such as 30 or more, such as 50 or more. In addition, n may be 100 or less, such as 80 or less, such as 60 or less, such as 50 or less, such 40 or less, such as 30 or less, such as 25 or less, such as 20 or less, such as 18 or less, such as 15 or less, such as 13 or less, such as 10 or less, such as 8 or less, such as 6 or less, such as 5 or less, such as 4 or less, such as 3 or less.

In one embodiment, the alkoxylated compound may be a compound have an $—(O—R_1)_n—R_2$ functionality wherein $R_1$ and n are as defined above. In addition, $R_2$ may be hydroxyl, alkoxy, or alkyl. In one embodiment, $R_2$ may be hydroxyl. In a further embodiment, $R_2$ may be alkoxy. For instance, $R_2$ may be methoxy, ethoxy, propoxy, or butoxy. In one embodiment, $R_2$ may be methoxy. In another embodiment, $R_2$ may be ethoxy. In an even further embodiment, $R_2$ may be alkyl. For instance, the alkyl may be an alkyl having from 1 to 5 carbon atoms, such as from 1 to 4 carbon atoms, such as from 1 to 3 carbon atoms, such as from 2 to 3 carbon atoms. In this regard, $R_2$ may be a methyl. In another embodiment, $R_2$ may be an ethyl. In a further embodiment, $R_2$ may be a propyl. In an even further embodiment, $R_2$ may be a butyl.

In one embodiment, the alkoxylated compound may be an alkoxylated polyol compound. For instance, the polyol compound may be any polyol compound as mentioned above. For instance, the alkoxylated polyol compound may be an alkoxylated sugar, alkoxylated sugar alcohol, alkoxylated polyether, alkoxylated polysaccharide, or a mixture thereof. In one embodiment, the alkoxylated polyol compound may include an alkoxylated glycerol. In another embodiment, the alkoxylated polyol compound may include an alkoxylated sugar. In a further embodiment, the alkoxylated polyol compound may include an alkoxylated sugar alcohol. In an even further embodiment, the alkoxylated polyol compound may include an alkoxylated polyether. In another further embodiment, the alkoxylated polyol compound may include an alkoxylated polysaccharide.

Accordingly, with the modification, the alkoxylated compound may be an ethoxylated compound, a propoxylated compound, or a mixture thereof. In one embodiment, the alkoxylated compound may be an ethoxylated compound. In another embodiment, the alkoxylated compound may be a propoxylated compound.

In this regard, when the compound is a polyol, with the modification, the alkoxylated compound may be an alkoxylated polyol compound. For instance, the alkoxylated polyol compound may be an ethoxylated polyol compound, a propoxylated polyol compound, or a mixture thereof. In one embodiment, the alkoxylated polyol compound may be an ethoxylated polyol compound. In another embodiment, the alkoxylated polyol compound may be a propoxylated polyol compound.

In particular embodiments, the alkoxylated compound may be an ethoxylated glycerin, a propoxylated glycerin, a polyethylene glycol, a polypropylene glycol, or a mixture thereof. For instance, in one embodiment, the alkoxylated compound may be an ethoxylated glycerin, a propoxylated glycerin, or a mixture thereof. In another embodiment, the alkoxylated compound may be a polyethylene glycol, a polypropylene glycol, or a mixture thereof.

Also, it should be understood that the polyol compound may include a combination of polyol compounds, such as any of those mentioned above. For instance, it should be understood that the polyol compound may include more than one different compound, such as more than one different polyol compound. For instance, in one embodiment, at least two different polyol compounds may be utilized. In another embodiment, at least three different polyol compounds may be utilized.

Similarly, it should be understood that the alkoxylated compound may include a combination of alkoxylated compounds, such as a combination of alkoxylated polyol compounds such as any of those mentioned above. For instance, it should be understood that the alkoxylated compound may include more than one different compound, such as more than one different alkoxylated polyol compound. For instance, in one embodiment, at least two different alkoxylated compounds, such as alkoxylated polyol compounds, may be utilized. In another embodiment, at least three different alkoxylated compounds, such as alkoxylated polyol compounds, may be utilized.

The polyol compound and/or the alkoxylated compound may have a relatively low molecular weight. For instance, the molecular weight may be 5,000 g/mol or less, such as 4,000 g/mol or less, such as 3,000 g/mol or less, such as 2,000 g/mol or less, such as 1,800 g/mol or less, such as 1,600 g/mol or less, such as 1,400 g/mol or less, such as 1,200 g/mol or less, such as 1,000 g/mol or less, such as 800 g/mol or less, such as 600 g/mol or less, such as 500 g/mol or less, such as 400 g/mol or less, such as 300 g/mol or less, such as 200 g/mol or less. The molecular weight may be 25 g/mol or more, such as 50 g/mol or more, such as 75 g/mol or more, such as 100 g/mol or more, such as 125 g/mol or more, such as 150 g/mol or more, such as 200 g/mol or more, such as 250 g/mol or more, such as 300 g/mol or more, such as 400 g/mol or more, such as 500 g/mol or more.

The polyol compound and/or the alkoxylated compound may be present in an amount of 0.001 lbs/MSF or more, such as 0.01 lbs/MSF or more, such as 0.05 lbs/MSF or more, such as 0.1 lbs/MSF or more, such as 0.2 lbs/MSF or more, such as 0.25 lbs/MSF or more, such as 0.5 lbs/MSF or more, such as 0.75 lbs/MSF or more, such as 1 lb/MSF or more, such as 1.5 lbs/MSF or more, such as 2 lbs/MSF or more, such as 2.5 lbs/MSF or more, such as 3 lbs/MSF or more, such as 4 lbs/MSF or more. The polyol compound and/or the alkoxylated compound may be present in an amount of 150 lbs/MSF or less, such as 100 lbs/MSF or less, such as 50 lbs/MSF or less, such as 25 lbs/MSF or less, such as 15 lbs/MSF or less, such as 10 lbs/MSF or less, such as 5 lbs/MSF or less, such as 4 lbs/MSF or less, such as 3 lbs/MSF or less, such as 2.5 lbs/MSF or less, such as 2 lbs/MSF or less, such as 1.5 lbs/MSF or less, such as 1 lbs/MSF or less. Such MSF value may be based on the weight of the gypsum panel in one embodiment. In another embodiment, such MSF value may be based the weight of the gypsum core. In a further embodiment, such MSF value may be based the weight of the gypsum within the gypsum core. In an even further embodiment, such MSF value may be based on the weight of a respective gypsum core layer.

The polyol compound and/or the alkoxylated compound may be present in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the gypsum panel. The polyol compound and/or the alkoxylated compound may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the gypsum panel. Alternatively, the weight percentage may be based on the weight of the gypsum core. In a further embodiment, such weight percentage may be based on the weight of the gypsum within the gypsum core. In an even further embodiment, such weight percentage may be based on the weight of a respective gypsum core layer. Also, the aforementioned weight percentages may be based on the solids content of the gypsum slurry.

In general, the composition of the gypsum core is not necessarily limited and may include any additives as known in the art. For instance, the additives may include dispersants, foam or foaming agents including aqueous foam (e.g. sulfates), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, colorants, fire retardants or additives (e.g., silica, silicates, expandable materials such as vermiculite, perlite, etc.), water repellants, fillers (e.g., glass spheres, glass fibers), natural and synthetic fibers (e.g. cellulosic fibers, microfribrillated fibers, nanocellulosic fibers, etc.), waxes (e.g., silicones, siloxanes, etc.), acids (e.g., boric acid), secondary phosphates (e.g., condensed phosphates or orthophosphates including trimetaphosphates, polyphosphates, and/or cyclophosphates, etc.), mixtures thereof, natural and synthetic polymers, starches, sound dampening polymers (e.g., viscoelastic polymers/glues, such as those including an acrylic/acrylate polymer, etc.; polymers with low glass transition temperature, etc.), etc., and mixtures thereof. In general, it should be understood that the types and amounts of such additives are not necessarily limited by the present invention.

Each additive may be present in the gypsum core in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less. The aforementioned weight percentages may also apply based on the weight of the gypsum in the gypsum panel. In one embodiment, the aforementioned weight percentages may also apply based on the weight of the gypsum panel. Alternatively, the weight percentages may be based on the weight of the gypsum core. In a further embodiment, such weight percentages may be based on the solids content of the gypsum slurry.

As indicated herein, the gypsum core is sandwiched by facing materials. The facing material may be any facing material as generally employed in the art. For instance, the facing material may be a paper facing material, a fibrous (e.g., glass fiber) mat facing material, or a polymeric facing material. In general, the first facing material and the second facing material may be the same type of material. Alternatively, the first facing material may be one type of material while the second facing material may be a different type of material.

In one embodiment, the facing material may include a paper facing material. For instance, both the first and second facing materials may be a paper facing material. Alternatively, in another embodiment, the facing material may be a glass mat facing material. For instance, both the first and second facing materials may be a glass mat facing material. In a further embodiment, the facing material may be a polymeric facing material. For instance, both the first and second facing materials may be a polymeric facing material. In another further embodiment, the facing material may be a metal facing material (e.g., an aluminum facing material). For instance, both the first and second facing materials may be a metal facing material (e.g., an aluminum facing material).

The glass mat facing material in one embodiment may be coated. However, in one particular embodiment, the glass mat facing material may not have a coating, such as a coating that is applied to the surface of the mat.

In general, the present invention is also directed to a method of making a gypsum panel. For instance, in the method of making a gypsum panel, a first facing material may be provided wherein the first facing material has a first facing material surface and a second facing material surface opposite the first facing material surface. The first facing material may be conveyed on a conveyor system (i.e., a continuous system for continuous manufacture of gypsum panel). Thereafter, a gypsum slurry may be provided or deposited onto the first facing material in order to form and provide a gypsum core. Next, a second facing material may be provided onto the gypsum slurry.

In general, the composition of the gypsum slurry and gypsum core is not necessarily limited and may be any generally known in the art. Generally, in one embodiment, the gypsum core is made from a gypsum slurry including at least stucco and water. However, as indicated herein, at least one gypsum slurry includes a polyol compound and/or an alkoxylated compound, such as an alkoxylated polyol compound, as defined herein. In this regard, the method may include a step of also combining the polyol compound and/or the alkoxylated compound with the stucco, water, and any optional additives as indicated herein.

In general, stucco may be referred to as calcined gypsum or calcium sulfate hemihydrate. The calcined gypsum may be from a natural source or a synthetic source and is thus not necessarily limited by the present invention. In addition to the stucco, the gypsum slurry may also contain some calcium sulfate dihydrate or calcium sulfate anhydrite. If calcium sulfate dihydrate is present, the hemihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hemihydrate and the calcium sulfate dihydrate. Furthermore, the calcined gypsum may be $\alpha$-hemihydrate, $\beta$-hemihydrate, or a mixture thereof.

In general, the gypsum, in particular the calcium sulfate dihydrate, is present in the gypsum core in an amount of at least 50 wt. %, such as at least 60 wt. %, such as at least 70 wt. %, such as at least 80 wt. %, such as at least 90 wt. %, such as at least 95 wt. %, such as at least 98 wt. %, such as at least 99 wt. %. The gypsum is present in an amount of 100 wt. % or less, such as 99 wt. % or less, such as 98 wt. % or less, such as 95 wt. % or less, such as 90 wt. % or less based on the weight of the solids in the gypsum slurry. In one embodiment, the aforementioned weight percentages are based on the weight of the gypsum core. In another embodiment, the aforementioned weight percentages are based on the weight of the gypsum panel.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

The polyol compound and/or the alkoxylated compound may be present in the gypsum slurry in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The polyol compound and/or the alkoxylated compound may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. In another embodiment, such weight percentage may be based on the weight of the gypsum slurry. In a further embodiment, such weight percentage may be based on the solids content of the gypsum slurry.

Furthermore, by incorporating the polyol compound and/ or the alkoxylated compound as indicated herein, the gypsum panel may have a relatively higher gypsum content after drying. For instance, the gypsum content may be 50% or more, such as 60% or more, such as 65% or more, such as 70% or more, such as 75% or more, such as 80% or more, such as 85% or more, such as 90% or more, such as 95% or more when determined based on the face or front of the gypsum panel. The gypsum content may be 100% or less, such as 95% or less, such as 90% or less, such as 85% or less when determined based on the face or front of the gypsum panel. The gypsum content may be 50% or more, such as 60% or more, such as 65% or more, such as 70% or more, such as 75% or more, such as 80% or more, such as 85% or more, such as 90% or more, such as 95% or more when determined based on the back of the gypsum panel. The gypsum content may be 100% or less, such as 95% or less, such as 90% or less, such as 85% or less, such as 80% or less, such as 75% or less, such as 70% or less when determined based on the back of the gypsum panel.

As indicated above, the gypsum slurry may also include water. Water may be employed for fluidity and also for rehydration of the gypsum to allow for setting. The amount of water utilized is not necessarily limited by the present invention.

The weight ratio of the water to the stucco may be 0.1 or more, such as 0.2 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

In addition to the stucco and the water, the gypsum slurry may also include any other conventional additives as known in the art. In this regard, such additives are not necessarily limited by the present invention. For instance, the additives may include dispersants, foam or foaming agents including aqueous foam (e.g. sulfates), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses and other fibers (e.g. cellulosic fibers, microfribrillated fibers, nanocellulosic fibers, etc.), high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers (e.g., glass fibers), waxes (e.g., silicones, siloxanes, etc.), secondary phosphates (e.g., condensed phosphates or orthophosphates including trimeta-phosphates, polyphosphates, and/or cyclophosphates, etc.), sound dampening polymers (e.g., viscoelastic polymers/glues, such as those including an acrylic/acrylate polymer, etc.; polymers with low glass transition temperature, etc.), mixtures thereof, natural and synthetic polymers, etc. In general, it should be understood that the types and amounts of such additives are not necessarily limited by the present invention.

Each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. The aforementioned weight percentages may also apply based on the weight of the gypsum in the gypsum panel. In addition, the aforementioned weight percentages may also apply based on the weight of the gypsum panel. Further, the aforementioned weight percentages may also apply based on the weight of the gypsum core. Also, the aforementioned weight percentages may also apply based on the solids content of the gypsum slurry.

The foaming agent may be one generally utilized in the art. For instance, the foaming agent may include an alkyl sulfate, an alkyl ether sulfate, or a mixture thereof. In one embodiment, the foaming agent includes an alkyl sulfate. In another embodiment, the foaming agent includes an alkyl ether sulfate. In a further embodiment, the foaming agent includes an alkyl sulfate without an alkyl ether sulfate. In an even further embodiment, the foaming agent includes a mixture of an alkyl sulfate and an alkyl ether sulfate. When a mixture is present, the alkyl ether sulfate may be present in an amount of 10 wt. % or less, such as 9 wt. % or less, such as 8 wt. % or less, such as 7 wt. % or less, such as 6 wt. % or less, such as 5 wt. % or less, such as 4 wt. % or less, such as 3 wt. % or less, such as 2 wt. % or less based on the combined weight of the alkyl sulfate and the alkyl ether sulfate. In addition, the alkyl ether sulfate may be present in an amount of 0.01 wt. % or more, such as 0.1 wt. % or more, such as 0.2 wt. % or more, such as 0.3 wt. % or more, such as 0.5 wt. % or more, such as 1 wt. % or more, such as 1.5 wt. % or more, such as 2 wt. % or more, such as 2.5 wt. % or more, such as 3 wt. % or more, such as 4 wt. % or more, such as 5 wt. % or more based on the combined weight of the alkyl sulfate and the alkyl ether sulfate.

The alkyl sulfate may have a general formula as follows:

$$H(CH_2)_n OSO_3^- M^+$$

wherein n is from 6 to 16 and M is a monovalent cation. In this regard, the alkyl sulfate includes alkyl chains. The alkyl may be linear, branched, or include a combination thereof. The average chain length of the alkyls may be 6 carbons or more, such as 7 carbons or more, such as 8 carbons or more, such as 9 carbons or more, such as 10 carbons or more, such as 11 carbons or more. The average chain length of the alkyls may be 15 carbons or less, such as 14 carbons or less, such as 13 carbons or less, such as 12 carbons or less, such as 11 carbons or less, such as 10 carbons or less, such as 9 carbons or less. In general, such average chain length is determined based on the length of the alkyl chains, not considering the length of any component of any alkyl ether sulfate that may be present. In addition, such average chain length is a weighted average chain length based on the amount of each specific alkyl present.

The monovalent cation may be sodium or ammonium. In one embodiment, the monovalent cation may be ammonium. In another embodiment, the monovalent cation may be sodium.

The alkyl ether sulfate may have a general formula as follows:

$$CH_3(CH_2)_x CH_2—(OCH_2CH_2)_y—OSO_3^- M^+$$

wherein x is from 4 to 13, y is from 0.05 to 5, and M is a monovalent cation.

The alkyl portion of the alkyl ether sulfate may be 6 carbons or more, such as 7 carbons or more, such as 8 carbons or more, such as 9 carbons or more, such as 10 carbons or more, such as 11 carbons or more. Accordingly, x may be 4 or more, such as 5 or more, such as 6 or more, such as 7 or more, such as 8 or more, such as 9 or more, such as 10 or more. The alkyl portion of the alkyl ether sulfate may be 15 carbons or less, such as 14 carbons or less, such as 13 carbons or less, such as 12 carbons or less, such as 11 carbons or less, such as 10 carbons or less, such as 9 carbons or less. Accordingly, x may be 13 or less, such as 11 or less, such as 10 or less, such as 9 or less, such as 8 or less.

The ethoxylated content (y) of the alkyl ether sulfate may be 0.05 or more, such as 0.1 or more, such as 0.2 or more, such as 0.3 or more, such as 0.5 or more, such as 1 or more, such as 1.2 or more, such as 1.5 or more, such as 1.8 or more, such as 2 or more, such as 2.2 or more, such as 2.5 or more, such as 3 or more. The ethoxylated content of the alkyl ether sulfate may be 5 or less, such as 4.8 or less, such as 4.5 or less, such as 4.3 or less, such as 4 or less, such as 3.7 or less, such as 3.5 or less, such as 3.2 or less, such as 3 or less, such as 2.8 or less, such as 2.5 or less, such as 2.3 or less, such as 2 or less, such as 1.7 or less, such as 1.5 or less, such as 1.3 or less, such as 1 or less, such as 0.9 or less, such as 0.7 or less.

The monovalent cation may be sodium or ammonium. In one embodiment, the monovalent cation may be ammonium. In another embodiment, the monovalent cation may be sodium.

As indicated, the foaming agent may include a combination of an alkyl sulfate and an alkyl ether sulfate. In this regard, the weight ratio of the alkyl sulfate to the alkyl ether sulfate may be 2 or more, such as 4 or more, such as 5 or more, such as 10 or more, such as 15 or more, such as 20 or more, such as 25 or more, such as 30 or more, such as 40 or more, such as 50 or more, such as 60 or more, such as 70 or more, such as 80 or more, such as 90 or more, such as 95 or more. The weight ratio may be less than 100, such as 99 or less, such as 98 or less, such as 95 or less, such as 90 or less, such as 85 or less, such as 80 or less, such as 75 or less, such as 70 or less, such as 60 or less, such as 50 or less, such as 40 or less, such as 30 or less, such as 20 or less, such as 15 or less, such as 10 or less, such as 8 or less, such as 5 or less, such as 4 or less.

By utilizing a soap or foaming agent as disclosed herein, the gypsum slurry may include bubbles or voids due to the soap/foaming agent having a particular size. Such size may then contribute to the void structure in the gypsum panel and the resulting properties. In this regard, the gypsum slurry may have bubbles or voids having a median size of 300 microns or more, such as 400 microns or more, such as 500 microns or more, such as 600 microns or more, such as 700 microns or more, such as 800 microns or more, such as 900 microns or more, such as 1,000 microns or more. The gypsum slurry may have bubbles or voids having a median size of 1,400 microns or less, such as 1,300 microns or less, such as 1,200 microns or less, such as 1,100 microns or less, such as 1,000 microns or less, such as 900 microns or less, such as 800 microns or less, such as 700 microns or less, such as 600 microns or less, such as 500 microns or less, such as 400 or less. Furthermore, while the aforementioned references a median size, it should be understood that in another embodiment, such size may also refer to an average size.

The foaming agent may be provided in an amount of 0.5 lbs/ft³ or more, such as 1 lbs/ft³ or more, such as 1.5 lbs/ft³ or more, such as 2 lbs/ft³ or more, such as 2.5 lbs/ft³ or more, such as 3 lbs/ft³ or more, such as 3.5 lbs/ft³ or more, such as 4 lbs/ft³ or more, such as 4.5 lbs/ft³ or more, such as 5 lbs/ft³ or more. The foaming agent may be provided in an amount of 25 lbs/ft³ or less, such as 20 lbs/ft³ or less, such as 15 lbs/ft³ or less, such as 13 lbs/ft³ or less, such as 11 lbs/ft³ or less, such as 10 lbs/ft³ or less, such as 9 lbs/ft³ or less, such as 8 lbs/ft³ or less, such as 7 lbs/ft³ or less, such as 6 lbs/ft³ or less.

As indicated above, the additives may include at least one dispersant. The dispersant is not necessarily limited and may include any that can be utilized within the gypsum slurry. The dispersant may include carboxylates, sulfates, sulfonates, phosphates, mixtures thereof, etc. For instance, in one embodiment, the dispersant may include a sulfate.

In another embodiment, the dispersant may include a carboxylate, such as a carboxylate ether and in particular a polycarboxylate ether or a carboxylate ester and in particular a polycarboxylate ester. In general, the carboxylate or polycarboxylate may be derived from an acrylic acid or a salt thereof, such as a methacrylic acid or a salt thereof. In addition, the polycarboxylate ether copolymer optionally has additional structural groups in copolymerized form. In this case, the additional structural groups may include styrenes, acrylamides, hydrophobic compounds, ester repeating unit, polypropylene oxide and polypropylene oxide/polyethylene oxide units. In addition, any comb-branched polycarboxylate dispersant may be useful in the slurry. In particular, the polycarboxylate dispersant may be one having polyether side chains. The polycarboxylate ester in some embodiments may be prepared by polymerization of a monomer mixture containing a carboxylic acid monomer as the main component. In other embodiments, it is advantageous if the formula (I) represents a polyether containing alkyl or vinyl groups. An aspect of many polycarboxylate esters is their antifoaming, defoaming and/or surface active properties. Therefore in some embodiments where the dispersant component is such a polycarboxylate ester, the dispersant component can provide antifoaming and surfactant effects in addition to their dispersing effect. In some embodiments, the monomer mixture includes an (alkoxy)polyalkylene glycol mono (meth)acrylate monomer.

In a further embodiment, the dispersant may include a sulfonate, such as a naphthalene sulfonate, a naphthalene sulfonate formaldehyde condensate, a sodium naphthalene sulfonate formaldehyde condensate, a lignosulfonate, a melamine formaldehyde condensate, or a mixture thereof. In particular, the sulfonate may be a polynaphthalene sulfonate in one embodiment. In another embodiment, the sulfonate may be a lignosulfonate. The sulfonate may have an average molecular weight of at least about 1000 g/mol, such as at least about 2000 g/mol, such as at least about 3000 g/mol, such as at least about 5000 g/mol, such as about at least about g/mol to about 40000 g/mol or less, such as about 30000 g/mol or less, such as about 25000 g/mol or less, such as about 20000 g/mol or less, such as about 15000 g/mol or less, such as about 10000 g/mol or less, such as about 8000 g/mol or less.

In another embodiment, the dispersant may include a phosphate. For instance, the phosphate dispersant may be a polyphosphate dispersant, such as sodium trimetaphosphate, sodium tripolyphosphate, potassium tripolyphosphate, tetrasodium pyrophosphate, tetrapotassium pyrophosphate, tetrapotassium pyrophosphate, or a mixture thereof. In one embodiment, the polyphosphate dispersant may be sodium trimetaphosphate.

In this regard, the dispersant may include a sulfonate, a polycarboxylate ether, a polycarboxylate ester, or a mixture thereof. In one embodiment, the dispersant may include a sulfonate. In another embodiment, the dispersant may include a polycarboxylate ether. In a further embodiment, the dispersant may include a polycarboxylate ester.

The dispersant may be provided in an amount of 0.5 lbs/ft$^3$ or more, such as 1 lbs/ft$^3$ or more, such as 1.5 lbs/ft$^3$ or more, such as 2 lbs/ft$^3$ or more, such as 2.5 lbs/ft$^3$ or more, such as 3 lbs/ft$^3$ or more, such as 3.5 lbs/ft$^3$ or more, such as 4 lbs/ft$^3$ or more, such as 4.5 lbs/ft$^3$ or more, such as 5 lbs/ft$^3$ or more. The dispersant may be provided in an amount of 25 lbs/ft$^3$ or less, such as 20 lbs/ft$^3$ or less, such as 15 lbs/ft$^3$ or less, such as 13 lbs/ft$^3$ or less, such as 11 lbs/ft$^3$ or less, such as 10 lbs/ft$^3$ or less, such as 9 lbs/ft$^3$ or less, such as 8 lbs/ft$^3$ or less, such as 7 lbs/ft$^3$ or less, such as 6 lbs/ft$^3$ or less.

The manner in which the components for the gypsum slurry are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the components are incorporated into the gypsum slurry is not necessarily limited by the present invention. Such components may be provided prior to a mixing device, directly into a mixing device, and/or even after the mixing device. For instance, the respective components may be provided prior to a mixing device. In another embodiment, the respective components may be provided directly into a mixing device. For instance, in one embodiment, the foaming agent or soaps may be provided directly into the mixer. Alternatively, the respective components may be provided after the mixing device (such as to the canister or boot, using a secondary mixer, or applied directly onto the slurry after a mixing device) and may be added directly or as part of a mixture. Whether provided prior to, into, or after the mixing device, the components may be combined directly with another component of the gypsum slurry. In addition, whether providing the components prior to or after the mixing device or directly into the mixing device, the compound may be delivered as a solid, as a dispersion/solution, or a combination thereof.

Furthermore, in one embodiment, the polyol compound and/or the alkoxylated compound as disclosed herein may be provided with the foaming agent/soap and/or dispersant. In this regard, the polyol compound and/or the alkoxylated compound and the foaming agent/soap and/or dispersant may be provided as a mixture. In another embodiment, the polyol compound and/or the alkoxylated compound and the foaming agent/soap and/or dispersant may be added contemporaneously.

Upon deposition of the gypsum slurry, the calcium sulfate hemihydrate reacts with the water to hydrate the calcium sulfate hemihydrate into a matrix of calcium sulfate dihydrate. Such reaction may allow for the gypsum to set and become firm thereby allowing for the panels to be cut at the desired length. In this regard, the method may comprise a step of reacting calcium sulfate hemihydrate with water to form calcium sulfate dihydrate or allowing the calcium sulfate hemihydrate to hydrate to calcium sulfate dihydrate. In this regard, the method may allow for the slurry to set to form a gypsum panel. In addition, during this process, the method may allow for dewatering of the gypsum slurry, in particular dewatering any free water instead of combined water of the gypsum slurry. Such dewatering may occur prior to the removal of any free moisture or water in a heating or drying device after a cutting step. Thereafter, the method may also comprise a step of cutting a continuous gypsum sheet into a gypsum panel. Then, after the cutting step, the method may comprise a step of supplying the gypsum panel to a heating or drying device. For instance, such a heating or drying device may be a kiln and may allow for removal of any free water. The temperature and time required for drying in such heating device are not necessarily limited by the present invention.

In one embodiment, the gypsum core may include a first gypsum core layer and a second gypsum core layer. The first gypsum core layer may be between the first facing material (i.e., front of the panel) and the second gypsum core layer. In addition, the first gypsum core layer may have a density greater than the second gypsum core layer. Accordingly, the first gypsum core layer may be formed using a gypsum slurry without the use of a foaming agent or with a reduced amount of foaming agent, which may be utilized in forming the second gypsum core layer. In this regard, in one embodiment, the first gypsum core layer may have the same composition as the second gypsum core layer except that the second gypsum core layer may be formed using a foaming agent or a greater amount of foaming agent.

In one embodiment, the gypsum core may also include a third gypsum core layer. The third gypsum core layer may be provided between the second gypsum core layer and a second facing material. Like the first gypsum core layer, the third gypsum core layer may also be a dense gypsum core layer. In particular, the third gypsum core layer may have a density greater than the second gypsum core layer. Accordingly, the third gypsum core layer may be formed using a gypsum slurry without the use of a foaming agent or with a reduced amount of foaming agent, which may be utilized in forming the second gypsum core layer. In this regard, in one embodiment, the third gypsum core layer may have the same composition as the second gypsum core layer except that the second gypsum core layer may be formed using a foaming agent or a greater amount of foaming agent.

When the gypsum core includes multiple gypsum core layers, the gypsum slurry may be deposited in multiple steps for forming the gypsum core. For instance, each gypsum core layer may require a separate deposition of gypsum slurry. In this regard, with a first gypsum core layer and a second gypsum core layer, a first gypsum slurry may be deposited followed by a second gypsum slurry. The first gypsum slurry and the second gypsum slurry may have the same composition except that the second gypsum slurry may include a foaming agent or more foaming agent than the first gypsum slurry. In this regard, in one embodiment, the first gypsum slurry may not include a foaming agent.

Accordingly, the first gypsum slurry may result in a dense gypsum core layer, in particular a non-foamed gypsum core layer. Such gypsum core layer may have a density greater than the gypsum core layer formed from the second gypsum slurry, or foamed gypsum core layer.

Similarly, when the gypsum core includes three gypsum core layers, the gypsum slurry may be deposited in three steps for forming the gypsum core. For example, a first and second gypsum slurry may be deposited as indicated above and a third gypsum slurry may be deposited onto the second gypsum slurry. The third gypsum slurry and the second gypsum slurry may have the same composition except that the second gypsum slurry may include a foaming agent or more foaming agent than the third gypsum slurry. In this regard, in one embodiment, the third gypsum slurry may not include a foaming agent. Accordingly, the third gypsum slurry may result in a dense gypsum core layer, in particular a non-foamed gypsum core layer. Such gypsum core layer may have a density greater than the gypsum core layer formed from the second gypsum slurry, or foamed gypsum core layer.

The first gypsum core layer may have a thickness that is 0.5% or more, such as 1% or more, such as 2% or more, such as 3% or more, such as 4% or more, such as 5% or more, such as 10% or more, such as 15% or more than the thickness of the second (or foamed) gypsum core layer. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less the thickness of the second (or foamed) gypsum core layer. In one embodiment, such relationship may also be between the third gypsum core layer and the second gypsum core layer.

The density of the second (or foamed) gypsum core layer may be 0.5% or more, such as 1% or more, such as 2% or more, such as 3% or more, such as 4% or more, such as 5% or more, such as 10% or more, such as 15% or more the density of the first (or non-foamed) gypsum core layer. The density of the second (or foamed) gypsum core layer may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum core layer. In one embodiment, such relationship may also be between the third gypsum core layer and the second gypsum core layer. In addition, in one embodiment, all of the gypsum core layers may have a different density.

In addition, the first gypsum core layer, the second gypsum core layer, and/or the third gypsum core layer may also have the additives as mentioned above. For instance, as indicated herein, the gypsum core includes a polyol compound and/or an alkoxylated compound. In this regard, in one embodiment, the first gypsum core layer may include the polyol compound and/or the alkoxylated compound as mentioned above. For instance, the compound may be present in the amounts as also mentioned herein. In another embodiment, the second gypsum core layer may include the polyol compound and/or the alkoxylated compound as mentioned above. For instance, the compound may be present in the amounts as also mentioned herein. In a further embodiment, the third gypsum core layer may include the polyol compound and/or the alkoxylated compound as mentioned above. For instance, the compound may be present in the amounts as also mentioned herein. In an even further embodiment, the first gypsum core layer and the second gypsum core layer may include the polyol compound and/or the alkoxylated compound as mentioned above. In another further embodiment, the first gypsum core layer, the second gypsum core layer, and the third gypsum core layer may include the polyol compound and/or the alkoxylated compound as mentioned above. Regardless of the above, the polyol compound and/or the alkoxylated compound may be present in any combination of gypsum core layers. In addition, the compound may be present in the amounts as also mentioned herein. However, in one embodiment, it should be understood that one or two of the aforementioned core layers may not include the polyol compound and/or the alkoxylated compound. For instance, the polyol compound and/or the alkoxylated compound may be present in an amount of less than 0.1 wt. %, such as less than 0.05 wt. %, such as less than 0.01 wt. %, such as less than 0.005 wt. %.

The gypsum panel disclosed herein may have many applications. For instance, the gypsum panel may be used as a standalone panel in construction for the preparation of walls, ceilings, floors, etc. As used in the present disclosure, the term "gypsum panel," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum panel forms part of a building structure, such as a wall or ceiling.

The thickness of the gypsum panel, and in particular, the gypsum core, is not necessarily limited and may be from about 0.25 inches to about 1 inch. For instance, the thickness may be at least ¼ inches, such as at least ⁵⁄₁₆ inches, such as at least ⅜ inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. In addition, at least two gypsum panels may be combined to create another gypsum panel, such as a composite gypsum panel. For example, at least two gypsum panels having a thickness of about ⁵⁄₁₆ inches each may be combined or sandwiched to create a gypsum panel having a thickness of about ⅝ inches. While this is one example, it should be understood that any combination of gypsum panels may be utilized to prepare a sandwiched gypsum panel. With regard to the thickness, the term "about" may be defined as within 10%, such as within 5%, such as within 4%, such as within 3%, such as within 2%, such as within 1%. However, it should be understood that the present invention is not necessarily limited by the aforementioned thicknesses.

In addition, the panel weight of the gypsum panel is not necessarily limited. For instance, the gypsum panel may have a panel weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The panel weight may be about 7000 lbs/MSF or less, such as about 6000 lbs/MSF or less, such as about 5000 lbs/MSF or less, such as about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such panel weight may be a dry panel weight such as after the panel leaves the heating or drying device (e.g., kiln).

In addition, the gypsum panel may have a density of about 5 pcf or more, such as about 6 pcf or more, such as about 7 pcf or more, such as about 8 pcf or more, such as about 9 pcf or more, such as about 10 pcf or more, such as about 11 pcf or more, such as about 12 pcf or more, such as about 13 pcf or more, such as about 14 pcf or more, such as about 15 pcf or more. The panel may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less, such as about 18 pcf or less, such as about 15 pcf or less, such as about 14 pcf or less, such as about 13 pcf or less, such as about 12 pcf or less, such as about 11 pcf or less, such as about 10 pcf or less.

The gypsum panel may have a certain nail pull resistance, which generally is a measure of the force required to pull a gypsum panel off a wall by forcing a fastening nail through the panel. The values obtained from the nail pull test generally indicate the maximum stress achieved while the fastener head penetrates through the panel surface and core. In this regard, the gypsum panel exhibits a nail pull resistance of at least about 25 $lb_f$, such as at least about 30 pounds, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as tested according to ASTM C1396. The nail pull resistance may be about 400 $lb_f$ or less, such as about 300 $lb_f$ or less, such as about 200 $lb_f$ or less, such as about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as tested according to ASTM C1396. Such nail pull resistance may be based upon the thickness of the gypsum panel. For instance, when conducting a test, such nail pull resistance values may vary depending on the thickness of the gypsum panel. As an example, the nail pull resistance values above may be for a ⅝ inch panel. However, it should be understood that instead of a ⅝ inch panel, such nail pull resistance values may be for any other thickness gypsum panel as mentioned herein.

The gypsum panel may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the density and thickness of the gypsum panel. For instance, when conducting a test, such compressive strength values may vary depending on the thickness of the gypsum panel. As an example, the compressive strength values above may be for a ⅝ inch panel. However, it should be understood that instead of a ⅝ inch panel, such compressive strength values may be for any other thickness gypsum panel as mentioned herein.

In addition, the gypsum panel may have a core hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$ as tested according to ASTM C1396. The gypsum panel may have a core hardness of 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as tested according to ASTM C1396. In addition, the gypsum panel may have an end hardness according to the aforementioned values. Such core hardness may be based upon the thickness of the gypsum panel. For instance, when conducting a test, such core hardness values may vary depending on the thickness of the gypsum panel. As an example, the core hardness values above may be for a $\frac{5}{8}$ inch panel. However, it should be understood that instead of a $\frac{5}{8}$ inch panel, such core hardness values may be for any other thickness gypsum panel as mentioned herein.

In addition, the gypsum panel may have an edge hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$, such as at least about 24 $lb_f$, such as at least about 28 $lb_f$, such as at least about 30 $lb_f$, such as at least about 33 $lb_f$ as tested according to ASTM C1396 and ASTM C473. The gypsum panel may have an edge hardness of about 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as tested according to ASTM C1396 and ASTM C473. Such edge hardness may be based upon the thickness of the gypsum panel. For instance, when conducting a test, such edge hardness values may vary depending on the thickness of the gypsum panel. As an example, the edge hardness values above may be for a $\frac{5}{8}$ inch panel. However, it should be understood that instead of a $\frac{5}{8}$ inch panel, such edge hardness values may be for any other thickness gypsum panel as mentioned herein.

In addition, it may also be desired to have an effective bond between the facing material and the gypsum core. Typically, a humidified bond test is performed for 2 hours in a humidity chamber at 90° F. and 90% humidity. In this test, after exposure, the facing material is removed to determine how much remains on the gypsum panel. The percent coverage (or surface area) can be determined using various optical analytical techniques. In this regard, the facing material may cover 100% or less, such as less than 90%, such as less than 80%, such as less than 70%, such as less than 60%, such as less than 50%, such as less than 40%, such as less than 30%, such as less than 25%, such as less than 20%, such as less than 15%, such as less than 10%, such as less than 9%, such as less than 8% of the surface area of the gypsum core upon conducting the test. Such percentage may be for a face of the gypsum panel. Alternatively, such percentage may be for a back of the gypsum panel. Further, such percentages may apply to the face and the back of the gypsum panel. In addition, such values may be for an average of at least 3 gypsum panels, such as at least 5 gypsum panels.

Also, it may be desired to have a particular humidified deflection based on exposure in an atmosphere of 90° F.±3° F. and 90%±3% relative humidity for 48 hours. For instance, the humidified deflection may be 0.1 inches or less, such as 0.08 inches or less, such as 0.06 inches or less, such as 0.05 inches or less, such as 0.04 inches or less, such as 0.03 inches or less, such as 0.02 inches or less, such as 0.01 inches or less, such as 0.005 inches or less. The humified deflection may be 0 inches or more, such as 0.0001 inches or more, such as 0.0005 inches or more, such as 0.001 inches or more, such as 0.003 inches or more, such as 0.005 inches or more, such as 0.008 inches or more, such as 0.01 inches or more, such as 0.015 inches or more. Such values may be for an average of at least 3 gypsum panels.

EXAMPLES

Test Methods

Average Void Size: The average void size is measured using a Scanning Electron Microscope at 50× magnification. The total area measured in one test is 4.89 mm². In particular, three samples are analyzed: the gypsum core close to the interface with the face paper; the center of the gypsum core;

and the gypsum core close to the interface with the back paper. These locations are randomly selected and as much as possible aligned from face to back within a particular cross-section. Then, all of the voids in the area are counted, an elliptical analytical tool is utilized to outline the boundary of each void, and a scale tool is utilized to obtain an average diameter of each void (e.g., if the void is elliptical then the average diameter is the average of the longest and the shortest axes cutting through the center of the ellipsis). The reporting includes the total bubble count, the sum of the areas of bubbles that are smaller than 150 microns expressed as a % of the total void area, and the midpoint bubble size defined as the size of the bubble at which the sum of the areas of voids below that size is equal to the sum of the areas of voids above that size.

Average Wall Thickness: Wall thicknesses are measured in an image that is 4.89 mm² area using a Scanning Electron Microscope at 50× magnification. In particular, four random locations are chosen along the center of the panel between the face and the back edges of the core. The average distance between adjacent voids along the 4 edges of the void in the SEM image are reported.

Nail Pull: The nail pull is determined in accordance with ASTM C1396. For these tests, the gypsum panels were conditioned at 70° F. and 50% relative humidity for at least 6 hours.

Core Compressive Strength: The core compressive strength is determined in accordance with a modified form of ASTM C473. For these tests, 3.75 inch discs (at least 3 per panel) were cut from a gypsum panel using a drill press. The samples were conditioned at least 4 hours in a chamber maintained at 70° F. and 50% relative humidity. The compressive strength was measured using an Instron 4486 instrument by applying a constant force at a ramp rate of 0.125 in/min using a 60K load cell. The max load for a disc was determined as the peak of the graph of load versus displacement. The core compressive strength (psi) was calculated as the max load in lbs divided by the area of the disc in square inches.

Humidified Deflection: The humidified deflection of the gypsum panel is determined in accordance with ASTM C36 and ASTM C473. In particular, two 12" by 24" specimens from the center of a gypsum panel are provided wherein the samples are obtained from at least 12" away from the end and edges of the gypsum panel. In addition, the 12" dimension shall be parallel to the machine/conveying direction while the 24" dimension shall be in the width direction of the gypsum panel. The specimens are conditioned at 70° F. and 50%±2% relative humidity for at least 24 hours. At the time of testing, moisture meter readings of the specimens shall be between 10-20. For the test, each specimen shall be placed face down on level support bars spaced 23" apart parallel to each other in an atmosphere of 90° F.±3° F. and 90%±3% relative humidity for 48 hours. After 48 hours, the deflection of the panel is measured to the nearest $\frac{1}{16}$" as the distance from the bottom of a straightedge placed across the top extremities of the specimen and the upper surface of the board at its center. The humidified deflection is reported to the nearest $\frac{1}{8}$". For these tests, at least three gypsum panels should be tested and an average value should be obtained.

Example 1

Gypsum panels were made using an alkyl sulfate foaming agent and a naphthalene sulfonate dispersant for the gypsum core. In certain panels, ethoxylated glycerin was also utilized for the gypsum core. The gypsum panels were compared against a panel that did not utilize glycerol. For the panels, the average void size and average wall thickness were determined. As indicated in the table below, the panels with ethoxylated glycerin exhibited an improvement in the average void size as well as in the average wall thickness.

| Sample | Panel Weight (lbs/MSF) | Surfactant (wt. % based on stucco) | Average Void Size (microns) | Average Wall Thickness (mm) |
|---|---|---|---|---|
| Comparative 1 | 1230 | 0.1% alkyl sulfate | 434 | 0.099 |
| Comparative 2 | 1304 | 0.09% alkyl sulfate | 788 | 0.1 |
| Comparative 3 | 1294 | 0.09% alkyl sulfate | 520 | 0.104 |
| 1 | 1347 | 0.07% alkyl sulfate + 0.02% ethoxylated glycerin | 626 | 0.162 |
| 2 | 1328 | 0.07% alkyl sulfate + 0.02% ethoxylated glycerin | 634 | 0.166 |
| 3 | 1374 | 0.07% alkyl sulfate + 0.02% ethoxylated glycerin | 729 | 0.157 |

Example 2

Gypsum panels were made using an alkyl sulfate foaming agent and a dispersant for the gypsum core. In certain panels, ethoxylated glycerin was also utilized for the gypsum core. The gypsum panels were compared against a panel that did not utilize glycerol. For the panels, the nail pull resistance and core compressive strength was determined. As indicated in the table below, the panels with ethoxylated glycerin exhibited an improvement in the mechanical properties.

| Sample | Panel Weight (lbs/MSF) | Surfactant (wt. % based on stucco) | Nail Pull (lb_f) | Core Compressive Strength (psi) |
|---|---|---|---|---|
| Comparative 4 | 1470 | 0.04% alkyl sulfate + 0.01% alkyl ether sulfate | 84 | 331 |
| 4 | 1487 | 0.06% alkyl sulfate + 0.02% ethoxylated glycerin | 94 | 418 |
| Comparative 5 | 1348 | 0.06% alkyl sulfate | 83.1 | 386.8 |
| 5 | 1358 | 0.06% alkyl sulfate + 0.02% ethoxylated glycerin | 92.1 | 422.3 |

Example 3

Gypsum panels were made using an alkyl sulfate foaming agent and a dispersant for the gypsum core. In certain panels, glycerin was also utilized for the gypsum core. The gypsum panels exhibited a desired humidified deflection.

22

| Sample | Glycerin (lbs/MSF) | Humidified Deflection (inches) |
|---|---|---|
| 6 | 0.7 | 0.0048 |
| 7 | 1.0 | 0.01 |
| 8 | 2.0 | 0.0245 |

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A gypsum panel comprising:
a gypsum core; and
a first facing material and a second facing material sandwiching the gypsum core;
wherein the gypsum core comprises:
gypsum;
at least one alkoxylated compound, present in an amount of 0.001 to 150 lbs/MSF;
at least one foaming agent, present in an amount 0.5 to 25 lbs/ft$^3$; and
a void structure of air voids generated by the foaming agent;
wherein the at least one alkoxylated compound provides an improved wall strength in the void structure, as indicated by wall thickness;
wherein the at least one alkoxylated compound comprises at least one alkoxylated polyol compound, which comprises at least one alkoxylated sugar alcohol, which comprises alkoxylated maltitol, alkoxylated sorbitol, alkoxylated mannitol, alkoxylated xylitol, alkoxylated erythritol, alkoxylated isomalt, alkoxylated threitol, alkoxylated arabitol, alkoxylated galactitol, alkoxylated fucitol, alkoxylated iditol, alkoxylated inositol, alkoxylated volemitol, alkoxylated lactitol, alkoxylated glycerol, or a mixture thereof; and
wherein the at least one foaming agent comprises an alkyl sulfate, an alkyl ether sulfate, or a mixture thereof.

2. The gypsum panel of claim 1, wherein the at least one alkoxylated compound comprises a compound having an —(O—R$_1$)$_n$-functionality wherein R$_1$ is an alkylene having from 1 to 5 carbon atoms and n is an integer of 1 or more.

3. The gypsum panel of claim 2, wherein R$_1$ is an alkylene having from 2 to 3 carbon atoms.

4. The gypsum panel of claim 1, wherein the at least one alkoxylated compound comprises a compound having an —(O—R$_1$)$_n$—R$_2$ functionality wherein R$_1$ is an alkylene having from 1 to 5 carbon atoms, n is an integer of 1 or more, and R$_2$ is hydroxyl, alkoxy, or alkyl.

5. The gypsum panel of claim 4, wherein R$_1$ is an alkylene having from 2 to 3 carbon atoms.

6. The gypsum panel of claim 4, wherein n is from 1 to 30.

7. The gypsum panel of claim 1, wherein the at least one alkoxylated compound comprises at least two alkoxylated polyol compounds, which comprises at least one alkoxylated sugar alcohol, which comprises alkoxylated maltitol, alkoxylated sorbitol, alkoxylated mannitol, alkoxylated xylitol, alkoxylated erythritol, alkoxylated isomalt, alkoxylated threitol, alkoxylated arabitol, alkoxylated galactitol, alkoxylated fucitol, alkoxylated iditol, alkoxylated inositol, alkoxylated volemitol, alkoxylated lactitol, alkoxylated glycerol, or a mixture thereof.

8. The gypsum panel of claim 1, wherein the at least on alkoxylated compound comprises at least one alkoxylated polyol compound, which comprises at least one alkoxylated sugar alcohol, which comprises alkoxylated maltitol, alkoxylated sorbitol, alkoxylated mannitol, alkoxylated xylitol, alkoxylated erythritol, alkoxylated isomalt, alkoxylated threitol, alkoxylated arabitol, alkoxylated galactitol, alkoxylated fucitol, alkoxylated iditol, alkoxylated inositol, alkoxylated volemitol, alkoxylated lactitol, or a mixture thereof.

9. The gypsum panel of claim 1, wherein the at least one alkoxylated compound comprises at least one alkoxylated polyol compound, which comprises at least one alkoxylated sugar alcohol, which comprises alkoxylated glycerol.

10. The gypsum panel of claim 9, wherein the alkoxylated glycerol is ethoxylated glycerol.

11. The gypsum panel of claim 1, wherein the at least one alkoxylated compound comprises an ethoxylated compound, a propoxylated compound, or a mixture thereof.

12. The gypsum panel of claim 1, wherein the air voids comprise air voids having a diameter of less than 150 microns, or less in an amount of from 0.01% to less than 50% of the total air voids.

13. The gypsum panel of claim 1, wherein the air voids comprise air voids having a diameter of less than 100 microns, in an amount of from 0.01% to less than 50% of the total air voids.

14. The gypsum panel of claim 1, wherein the air voids have an average air void size of 150 microns er mere to 1,500 microns.

15. The gypsum panel of claim 1, wherein the air voids have an average air void size of 400 microns to 1,500 microns.

16. The gypsum panel of claim 1, wherein the air voids have an average wall thickness of from 0.05 mm to 0.4 mm.

17. The gypsum panel of claim 16, wherein the air voids have an average wall thickness of 0.1 mm to 0.4 mm.

18. The gypsum panel of claim 1, wherein the gypsum panel has a nail pull resistance of about 70 $lb_f$ to about 400 $lb_f$.

19. The gypsum panel of claim 1, wherein the gypsum panel has a core compressive strength of from 200 psi to 1500 psi.

20. The gypsum panel of claim 1, wherein the gypsum core is formed from a gypsum slurry comprising stucco, water, the at least one alkoxylated compound, and the at least one foaming agent.

21. The gypsum panel of claim 1, wherein the gypsum core further comprises a dispersant.

* * * * *